United States Patent [19]

Makino et al.

[11] Patent Number: 5,200,897
[45] Date of Patent: Apr. 6, 1993

[54] VEHICLE CONTROL SYSTEM

[75] Inventors: Nobuhiko Makino, Anjo; Teruyoshi Wakao, Nagoya; Shinichi Yamada, Kariya; Susumu Masutomi, Toyota, all of Japan

[73] Assignee: Nippondenso Co., Ltd., Kariya, Japan

[21] Appl. No.: 528,890

[22] Filed: May 25, 1990

[30] Foreign Application Priority Data

May 26, 1989 [JP] Japan .................................. 1-134128

[51] Int. Cl.$^5$ .............................................. B60T 8/32
[52] U.S. Cl. .................................. 364/426.02; 303/92; 303/96; 303/103
[58] Field of Search ....................... 364/426.02, 426.03; 180/197; 303/92, 95, 96, 100, 102, 103, 109

[56] References Cited

U.S. PATENT DOCUMENTS

| | | | |
|---|---|---|---|
| 4,088,375 | 5/1978 | DePas, Sr. ............................ | 303/96 |
| 4,545,623 | 10/1985 | Sato et al. ............................ | 303/92 |
| 4,929,035 | 5/1990 | Shimanuki ....................... | 364/426.02 |
| 5,082,333 | 1/1992 | Fukushima et al. .................. | 303/96 |

FOREIGN PATENT DOCUMENTS

| | | |
|---|---|---|
| 58-221752 | 12/1983 | Japan . |
| 59-6163 | 1/1984 | Japan . |
| 59-26351 | 2/1984 | Japan . |
| 59-227548 | 12/1984 | Japan . |
| 60-35650 | 2/1985 | Japan . |
| 60-259560 | 12/1985 | Japan . |
| 62-241756 | 10/1987 | Japan . |
| 63-57359 | 3/1988 | Japan . |
| 1414341 | 11/1975 | United Kingdom . |
| 2125914 | 3/1984 | United Kingdom . |

*Primary Examiner*—Gary Chin
*Attorney, Agent, or Firm*—Cushman, Darby & Cushman

[57] ABSTRACT

A plurality of speed sensors sense rotational speeds of respective vehicle wheels including a right-hand vehicle wheel and a left-hand vehicle wheel. A speed of the right-hand vehicle wheel and a speed of the left-hand vehicle wheel are calculated on the basis of detection signals of the speed sensors. A judgment is made as to whether or not a vehicle wheel having a small tire is present in the vehicle wheels on the basis of the calculated speeds of the right-hand vehicle wheel and the left-hand vehicle wheel. In cases where a vehicle wheel having a small tire is judged to be absent, a control quantity is calculated by use of all the detection signals of the speed sensors. In cases where a vehicle wheel having a small tire is judged to be present, a control quantity is calculated by use of the detection signals of the speed sensors except the detection signal of the speed sensor of the vehicle wheel having the small tire. A controlled object is controlled in accordance with the calculated control quantity.

7 Claims, 10 Drawing Sheets

VEHICLE CONTROL SYSTEM

BACKGROUND OF THE INVENTION

1. Field of the Invention

This invention relates to a vehicle control system such as an antiskid control system which controls a vehicle on the basis of a vehicle wheel speed.

2. Description of the Prior Art

In automotive vehicles, a spare tire is kept as a substitute in case an original tire breaks down. Some spare tires are smaller in effective outside diameter than standard tires.

Japanese published unexamined patent application 59-6163 discloses a vehicle anti-lock control system including an arrangement which functions to judge whether or not a tire having a smaller effective diameter is used by the related vehicle. In this prior-art anti-lock control system, when a tire having a smaller effective diameter is judged to be used, the anti-lock control is removed.

British patent 1,414,341 discloses an anti-lock control system for a combination of a towing truck and a trailer which have different wheel sizes. This prior-art anti-lock control system includes a compensating arrangement which prevents the anti-lock control from being adversely affected by the different wheel sizes.

SUMMARY OF THE INVENTION

It is an object of this invention to provide an excellent vehicle control system.

According to a first aspect of this invnetion, a vehicle control system comprises a plurality of speed sensors sensing rotational speeds of respective vehicle wheels including a right-hand vehicle wheel and a left-hand vehicle wheel; means for calculating a speed of the right-hand vehicle wheel and a speed of the left-hand vehicle wheel on the basis of detection signals of the speed sensors; means for judging whether or not a vehicle wheel having a small tire is present in the vehicle wheels on the basis of the calculated speeds of the right-hand vehicle wheel and the left-hand vehicle wheel; means for, in cases where the judging means judges a vehicle wheel having a small tire to be absent, calculating a control quantity by use of all the direction signals of the speed sensors, and for, in cases where the judging means judges a vehicle wheel having a small tire to be present, calculating a control quantity by use of the detection signals of the speed sensors except the detection signal of the speed sensor of the vehicle wheel having the small tire; and means for controlling a controlled object in accordance with the calculated control quantity.

According to a second aspect of this invention, a vehicle control system comprises a plurality of speed sensors sensing rotational speeds of respective at least three vehicle wheels including a right-hand vehicle wheel and a left-hand vehicle wheel; means for calculating speeds of the vehicle wheels on the basis of detection signals of the speed sensors; means for judging whether or not tires having different sizes are used in the right-hand vehicle wheel and the left-hand vehicle wheel on the basis of the calculated speeds of the vehicle wheels; means for, in cases where the judging means judges tires having different sizes to be used, selecting one of the right-hand vehicle wheel and the left-hand vehicle wheel which uses a smaller of the tires; means for calculating a corrective coefficient on the basis of the calculated speeds of the vehicle wheels except the calculated speed of the vehicle wheel selected by the selecting means, wherein one of a front vehicle wheel and a rear vehicle wheel is defined as a reference and the other of the front vehicle wheel and the rear vehicle wheel is a corrected object, wherein the corrective coefficient is intended to correct a deviation of the speed of the other of the front vehicle wheel and the rear wheel with respect to said reference one of the front vehicle wheel and the rear wheel; means for correcting the speed of the other of the front vehicle wheel and the rear vehicle wheel by use of the corrective coefficient calculated by the corrective-coefficient-calculating means to remove a difference between the speeds of the front vehicle wheel and the rear vehicle wheel; means for excluding the speed of the vehicle wheel selected by the selecting means, and for calculating an estimated speed of a vehicle on the basis of the vehicle wheel speed being the reference and on the basis of the corrected vehicle wheel speed; and means for controlling a controlled object of the vehicle in accordance with the estimated vehicle speed.

According to a third aspect of this invention, a control system for a vehicle having a plurality of vehicle wheels and a controlled object comprises a plurality of sensors sensing rotational speeds of the vehicle wheels and generating sensor signals representing the sensed speeds of the vehicle wheels respectively; means for controlling the controlled object of the vehicle in accordance with the sensor signals; means for detecting that effective outside diameters of the vehicle wheels are appreciably different; means for identifying the sensor signal which represents the sensed speed of the vehicle wheel having a smaller effective outside diameter when the detecting means detects that the effective outside diameters of the vehicle wheels are appreciably different; and means for excluding the sensor signal identified by the identifying means from the controlling of the controlled object by the controlling means when the detecting means detects that the effective outside diameters of the vehicle wheels are appreciably different.

DESCRIPTION OF THE PREFERRED EMBODIMENT

Figure 1:
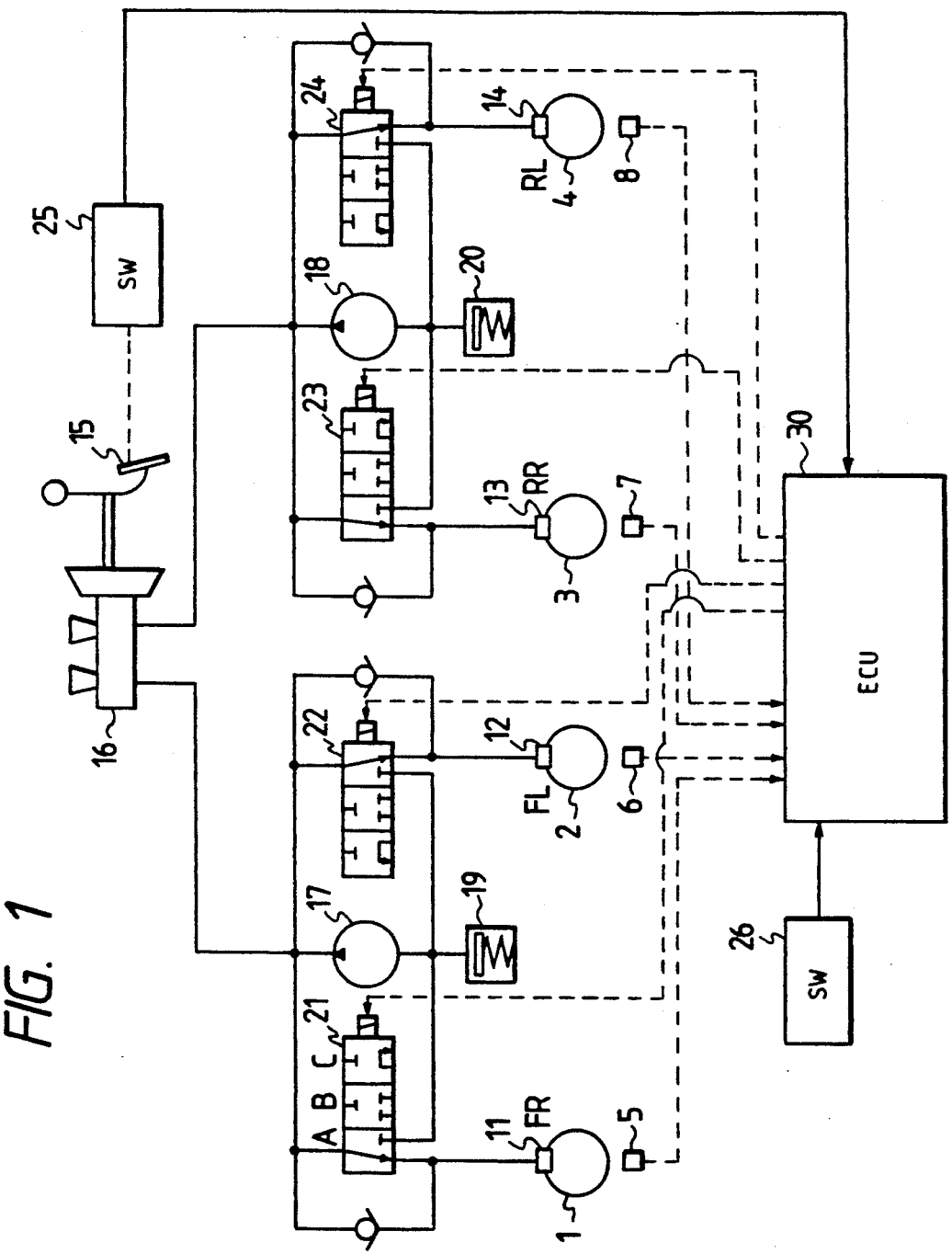
FIG. 1 is a diagram of a vehicle control system according to an embodiment of this invention.

With reference to FIG. 1, an automotive vehicle has a front right (FR) wheel 1, a front left (FL) wheel 2, a rear right (RR) wheel 3, and a rear left (RL) wheel 4. The vehicle rear wheels 3 and 4 are connected to an automotive engine (not shown) via a power transmission mechanism (not shown) so that they are driven by the engine. Sensors 5, 6, 7, and 8 associated with the vehicle wheels 1, 2, 3, and 4 output pulse signals representing the rotational speeds of the wheels 1, 2, 3, and 4 respectively.

Hydraulic brake units 11, 12, 13, and 14 including wheel cylinders are associated with the vehicle wheels 1, 2, 3, and 4 respectively. A master cylinder 16 connected to a brake pedal 15 generates a hydraulic pressure in response to a depression of the brake pedal 15. The generated hydraulic pressure is transmitted from the master cylinder 16 to the brake units 11, 12, 13, and 14 through actuators 21, 22, 23, and 24, and hydraulic lines respectively. The brake units 11-14 generate braking forces in response to the received hydraulic pressure and applies the braking forces to the vehicle wheels 1-4 to brake the latters respectively. A stop switch 25 associated with the brake pedal 15 generates a brake signal indicating whether or not the brake pedal 15 is depressed, that is, whether or not the vehicle is braked. Specifically, the brake signal assumes an "on" state when the vehicle is braked, and it assumes an "off" state when the vehicle is released from the brake. The brake signal is outputted from the stop switch 25 to an electronic control unit (ECU) 30.

As understood from the previous description, the vehicle wheels 1-4 can be braked in response to the hydraulic pressure which is generated by the master cylinder 16 upon a depression of the brake pedal 15. Braking forces applied to the vehicle wheels 1-4 depend on hydraulic braking pressures applied to the brake units 11-14 respectively. The hydraulic braking pressures can be controlled in response to the hydraulic pressure generated by the master cylinder 16. Also, the hydraulic braking pressures can be controlled by an antiskid control system which will be explained hereinafter.

Hydraulic pumps 17 and 18 driven by an electric motor (not shown) serve to generate hydraulic pressures. The inlet of the pump 17 is connected to a reservoir 19. The outlet of the pump 17 is connected to the brake units 11 and 12 via the actuators 21 and 22 respectively. Thus, the hydraulic pressure generated by the pump 17 can be transmitted to the brake units 11 and 12. In addition, the hydraulic pressures applied to the brake units 11 and 12 in response to the hydraulic pressure of the pump 17 can be adjusted by the actuators 21 and 22 respectively. The inlet of the pump 18 is connected to a reservoir 20. The outlet of the pump 18 is connected to the brake units 13 and 14 via the actuators 23 and 24 respectively. Thus, the hydraulic pressure generated by the pump 18 can be transmitted to the brake units 13 and 14. In addition, the hydraulic pressures applied to the brake units 13 and 14 in response to the hydraulic pressure of the pump 18 can be adjusted by the actuators 23 and 24 respectively.

The actuator 21 includes an electromagnetic or solenoid valve which is changeable among three different positions A, B, and C corresponding to a pressure increasing mode, a pressure maintaining mode, and a pressure decreasing mode respectively. When the actuator 21 assumes the pressure increasing position A, the actuator 21 allows the transmission of the pressure of the pump 17 to the brake unit 11 to increase the hydraulic braking pressure applied to the brake unit 11. When the actuator 21 assumes the pressure maintaining position B, the actuator 21 disconnects the brake unit 11 from both of the pump 17 and the reservoir 19 to keep essentially constant the hydraulic braking pressure applied to the brake unit 11. When the actuator 21 assumes the pressure decreasing position C, the actuator 21 connects the brake unit 11 to the reservoir 19 to decrease the hydraulic braking pressure applied to the brake unit 11. In this way, the hydraulic braking pressure applied to the brake unit 11 can be adjusted by the actuator 21. The position of the actuator 21 is changed by a control drive signal fed from the ECU 30. When the actuator 21 is de-energized by the control drive signal, the actuator 21 assumes the pressure increasing position A. When the actuator 21 is energized by the control drive signal having a first predetermined current level, the actuator 21 assumes the pressure maintaining position B. When the actuator 21 is energized by the control drive signal having a second predetermined current level, the actuator 21 assumes the pressure decreasing position C.

The designs of the actuators 22-24 are similar to the design of the actuator 21. The braking pressures applied to the brake units 12-14 can be adjusted by the actuators 22-23 respectively in a manner similar to the adjustment of the braking pressure to the brake unit 11 by the actuator 21. The positions of the actuators 22-24 are changed by respective control drive signals in a manner similar to the position control of the actuator 21 by the related control drive signal. The control drive signals are fed from the ECU 30 to the respective actuators 22-24.

When an ignition switch 26 is moved to an "on" position, the ECU 30 is supplied with an electric power and is thus activated. The ECU 30 receives the wheel speed signals from the sensors 5-8 and also receives the brake signal from the stop switch 25, performing calculations and processes for the slip control of the vehicle wheels 1-4 in accordance with the received wheel speed signals and the received brake signal and outputting the control signals to the actuators 21-24 in response to the results of the calculations and processes.

Figure 2:
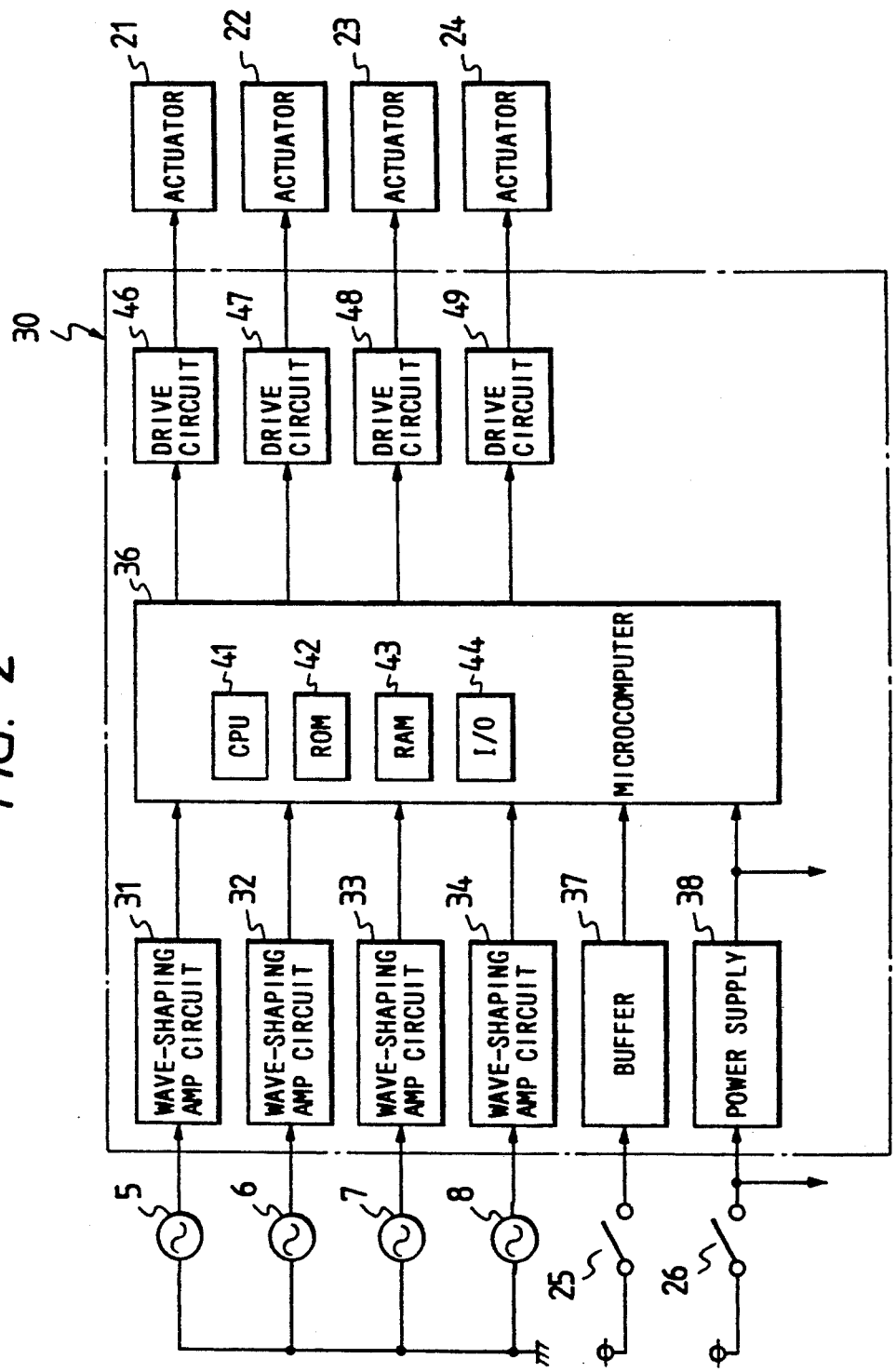
FIG. 2 is a block diagram of the electronic control unit and the related electric parts in the vehicle control system of FIG. 1.

As shown in FIG. 2, the ECU 30 includes wave-shaping and amplifying circuits 31, 32, 33, and 34, a microcomputer 36, a buffer circuit 37, a power supply circuit 38, and drive circuits 46, 47, 48, and 49. The wave-shaping and amplifying circuits 31-34 receive the wheel speed signals from the sensors 5-8 respectively and convert the waveforms of the wheel speed signals into respective waveforms suited to the processing by a microcomputer 36. The output signals from the wave-shaping and amplifying circuits 31-34 are fed to the microcomputer 36. The buffer circuit 37 receives the brake signal from the stop switch 25 and temporarily holds the received brake signal. The output signal from the buffer circuit 37 is fed to the microcomputer 36. The power supply circuit 38 is electrically connected to the ignition switch 26. When the ignition switch 26 is moved to an "on" position, the power supply circuit 38 feeds a constant drive voltage to the microcomputer 36 and other devices within the ECU 30 to activate them.

The microcomputer 36 includes a combination of a CPU 41, a ROM 42, a RAM 43, and an I/O circuit 44. The ROM 42 stores a program controlling the operation of the CPU 41. The microcomputer 36 generates control signals on the basis of the output signals from the circuits 31-34, and 37 and outputs the control signals to the respective drive circuits 46-49. The drive circuits 46-49 convert the control signals into signals suited to the drive and the control of the actuators 21-24 respectively.

When the ignition switch 26 is moved to the "on" position, the microcomputer 36 and other devices within the ECU 30 are powered by the constant drive voltage of the power supply circuit 38 so that the microcomputer 36 starts to operate in accordance with the program in the ROM 42.

Figure 3:
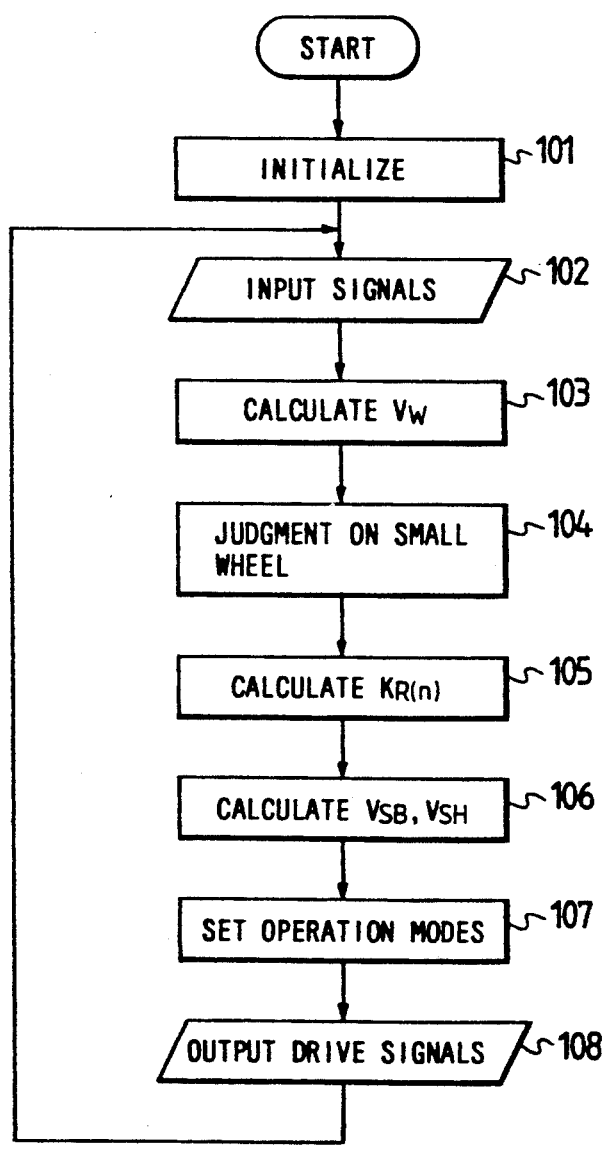
FIG. 3 is a flowchart of a program operating the microcomputer of FIG. 2.

FIG. 3 is a flowchart of an antiskid control routine of the program. The antiskid control routine is reiterated at a predetermined period by a timer-based interruption process.

As shown in FIG. 3, a first block 101 of the antiskid control program executes initialization for setting variables to predetermined initial values. After the block 101, the program advances to a block 102.

The block 102 reads the output signals from the sensors 5-8 and the stop switch 25. A block 103 following the block 102 calculates the current rotational speeds $V_{WFR}$, $V_{WFL}$, $V_{WRR}$, and $V_{WRL}$ of the vehicle wheels 1, 2, 3, and 4 on the basis of the output signals from the sensors 5, 6, 7, and 8 respectively.

A block 104 following the block 103 judges whether or not the effective outside diameters of the front wheels 1 and 2 are appreciably different, that is, whether or not a tire having a smaller effective diameter is used in one of the front wheels 1 and 2. In addition, when a tire having a smaller effective diameter is judged to be used in one of the front wheels 1 and 2, the block 104 detects which of the front wheels 1 and 2 uses the smaller tire. Similarly, the block 104 judges whether or not the effective outside diameters of the rear wheels 3 and 4 are appreciably different, that is, whether or not a tire having a smaller effective diameter is used in one of the rear wheels 3 and 4. In addition, when a tire having a smaller effective diameter is judged to be used in one of the rear wheels 3 and 4, the block 104 detects which of the rear wheels 3 and 4 uses the smaller tire.

A block 105 following the block 104 calculates a corrective coefficient $K_{R(n)}$ which will be used by a later block in correcting the rotational speeds of the rear wheels 3 and 4. In the case where the design of the front wheel sensors 5 and 6 differs from the design of the rear wheel sensors 7 and 8, this correcting process functions to compensate the structural difference between the front wheel sensors and the rear wheel sensors.

A block 106 following the block 105 calculates an estimated current vehicle speed $V_{SB}$ on the basis of the current wheel rotational speeds. In addition, the block 106 calculates a slip judgment reference speed $V_{SH}$ on the basis of the estimated current vehicle speed.

The basic function by the block 106 will be explained hereinafter. At first, one of the current wheel rotational speeds $V_{WFR}$, $V_{WFL}$, $V_{WRR}$, and $V_{WRL}$ is selected as a wheel speed $V_{WO}$ by referring to the following equation.

$$V_{WO} = MAX(V_{WFO}, V_{WRO}) \quad (1)$$

where the character $V_{WFO}$ denotes selected one of the front-wheel rotational speeds $V_{WFR}$ and $V_{WFL}$; the character $V_{WRO}$ denotes selected one of the rear-wheel rotational speeds $V_{WRR}$ and $V_{WRL}$; and the character MAX represents the operator selecting the higher of the selected speeds $V_{WFO}$ and $V_{WRO}$. Then, an estimated vehicle speed $V_{SB}$ is calculated by referring to the following equation.

$$V_{SB(n)} = MED(V_{WO}, V_{SB(n-1)} + a_{UP} \cdot t, V_{SB(n-1)} - a_{DW} \cdot t) \quad (2)$$

where the character $V_{SB(n)}$ denotes the estimated vehicle speed calculated in the current execution cycle of the program; the character $V_{SB(n-1)}$ denotes the estimated vehicle speed calculated in the immediately preceding execution cycle of the program; the characters $a_{UP}$ and $a_{DW}$ denote predetermined constant values corresponding given accelerations respectively; the character "t" denotes the calculation period, that is, the interval between the two successive execution cycles of the program; and the character MED denotes the operator selecting the intermediate one of the three values in the parenthesis. For example, the values $a_{UP}$ and $a_{DW}$ are set to 0.5 G and 1.0 G respectively.

A block 107 following the block 106 compares the current rotational speeds of the front wheels 1 and 2 with the slip judgment reference speed $V_{SH}$ to determine whether or not slip control should be performed on the front wheels 1 and 2. The block 107 calculates corrected rotational speeds of the rear wheels 3 and 4 which are equal to the current rear-wheel rotational speeds multiplied by the corrective coefficient $K_{R(n)}$. The block 107 compares the corrected rear-wheel rotational speeds with the slip judgment reference speed $V_{SH}$ to determine whether or not slip control should be performed on the rear wheels 3 and 4. In addition, the block 107 judges whether or not the slip control of the vehicle wheels 1-4 is currently performed. Then, the block 107 determines desired positions of the actuators 21-24 in accordance with the results of the previous determination and judgment regarding the slip control. Furthermore, the block 107 sets a flag $f_{ACT}$ to "1" when the slip control is started. The block 107 resets the flag $f_{ACT}$ to "0" when the slip control is finished. Thus, the flag $f_{ACT}$ represents whether or not the slip control is currently performed. As will be made clear later, the flag $f_{ACT}$ is checked in the blocks 104 and 105.

A block 108 following the block 107 outputs control signals to the drive circuits 46-49 which are generated in accordance with the desired positions of the actuators 21-24. The actuators 21-24 are driven by the output signals from the drive circuits 46-49 so that the actual positions of the actuators 21-24 will agree with the desired positions thereof. After the block 108, the program returns to the block 102.

Figure 4A:
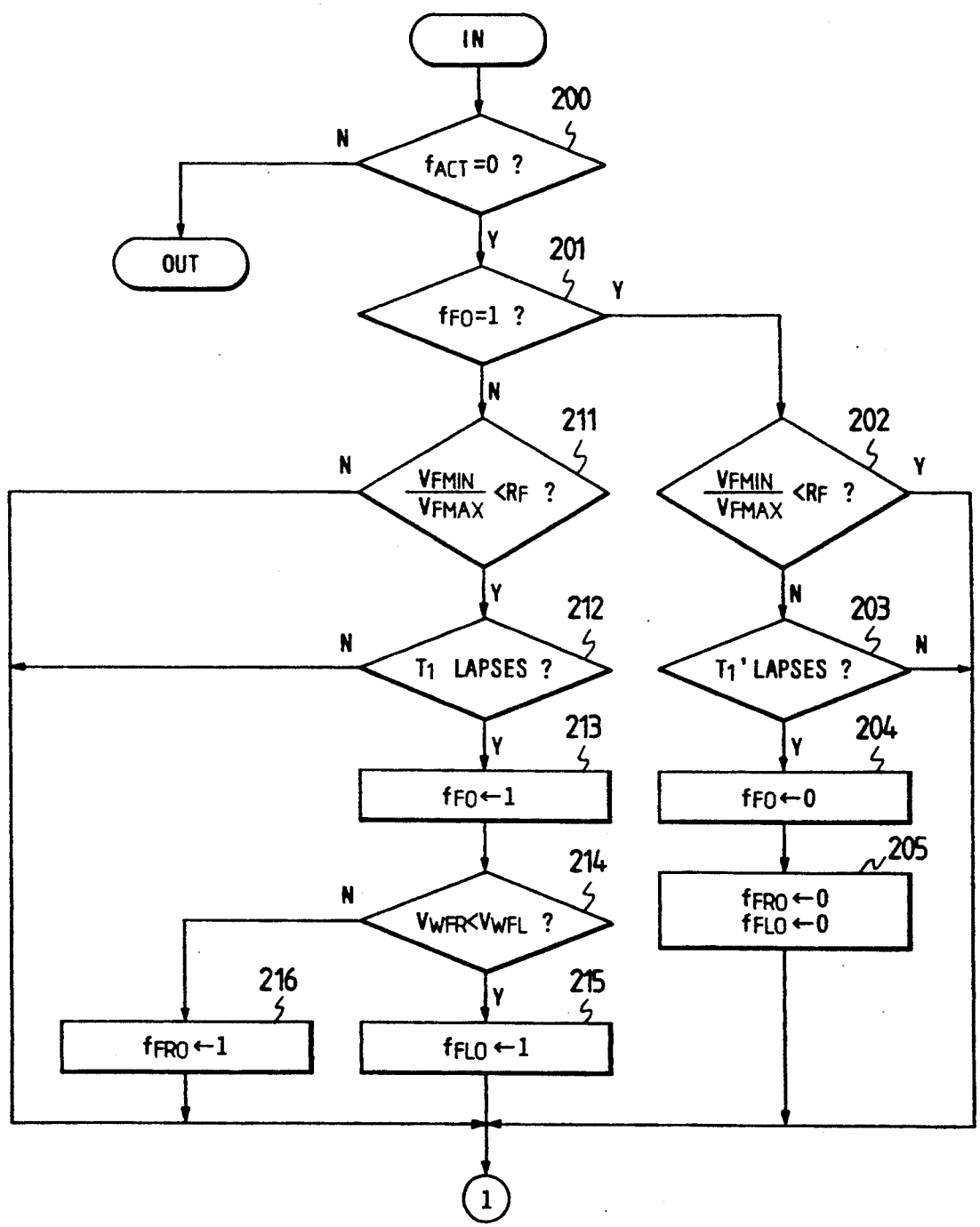
FIGS. 4(a) and 4(b) are a flowchart showing the internal design of the judgment block of FIG. 3.
Figure 4B:
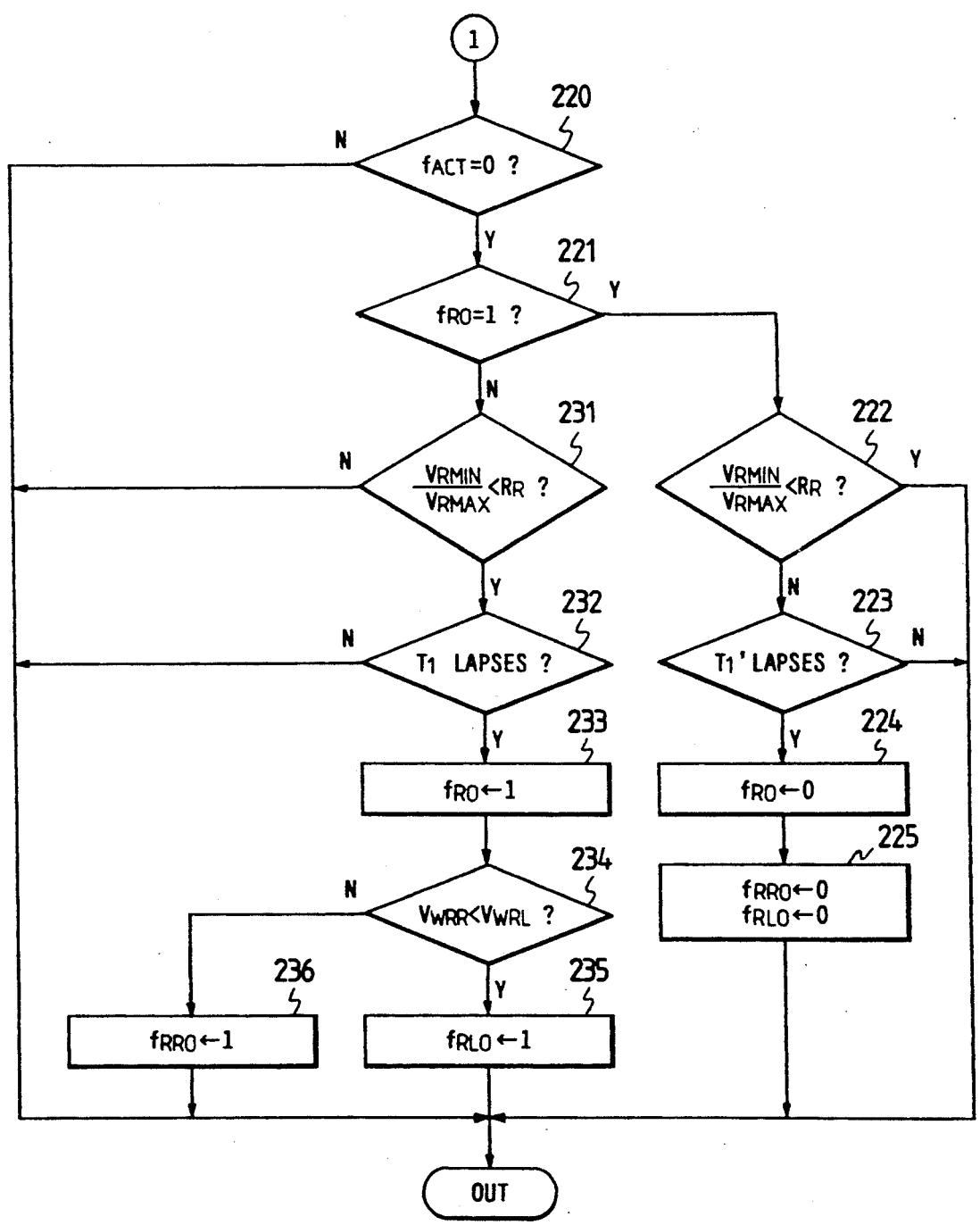

FIGS. 4(a) and 4(b) show an internal design of the judgment block 104. A first step 200 of the block 104 checks whether or not the flag $f_{ACT}$ is equal to "0", that is, whether or not the slip control is currently performed. When the flag $f_{ACT}$ is equal to "0", that is, when the slip control is not currently performed, the program advances to a step 201. When the flag $f_{ACT}$ is not equal to "0", that is, when the slip control is currently performed, the program exits from the block 104 and proceeds to the block 105 (see FIG. 3).

The step 201 checks whether or not a flag $f_{FO}$ is equal to "1". As will be made clear later, the flag $f_{FO}$ being equal to "1" represents that an appreciable difference is present between the rotational speeds of the front wheels 1 and 2. When the flag $f_{FO}$ is equal to "1", that is, when an appreciable difference is present between the rotational speeds of the front wheels 1 and 2, the program advances to a step 202. Otherwise, the program advances to a step 211.

The step 202 judges whether or not the ratio $V_{FMIN}/V_{FMAX}$ between the current rotational speeds of the front wheels 1 and 2 is smaller than a predetermined reference value $R_F$. The character $V_{FMIN}$ represents the smaller of the current front-wheel rotational speeds $V_{WFR}$ and $V_{WFL}$. The character $V_{FMAX}$ represents the higher of the current front-wheel rotational speeds $V_{WFR}$ and $V_{WFL}$. When the ratio $V_{FMIN}/V_{FMAX}$ is smaller than the predetermined reference value $R_F$, the program jumps to a step 220. When the ratio $V_{FMIN}/V_{FMAX}$ is equal to or greater than the predetermined reference value $R_F$, the program advances to a step 203.

The step 203 calculates the elapsed time during which the ratio $V_{FMIN}/V_{FMAX}$ has been continuously equal to or greater than the predetermined reference value $R_F$. The step 203 compares the calculated elapsed time with a predetermined reference time $T_1'$ to detect whether or not the ratio $V_{FMIN}/V_{FMAX}$ has been continuously equal to or greater than the predetermined reference value $R_F$ for the predetermined reference time $T_1'$ or longer. When the ratio $V_{FMIN}/V_{FMAX}$ has been continuously equal to or greater than the predetermined reference value $R_F$ for the predetermined reference time $T_1'$ or longer, the program advances to a step 204. Otherwise, the program jumps to the step 220.

The step 204 sets the flag $f_{FO}$ to "0". The flag $f_{FO}$ being equal to "0" represents the absence of an appreciable difference between the current front-wheel rotational speeds. After the step 204, the program advances to a step 205.

The step 205 resets flags $f_{FRO}$ and $f_{FLO}$ to "0". The flag $f_{FRO}$ being equal to "0" represents that a smaller tire is not used in the front right wheel 1. The flag $f_{FLO}$ being equal to "0" represents that a smaller tire is not used in the front left wheel 2. After the step 205, the program advances to the step 220.

The step 211 judges whether or not the ratio $V_{FMIN}/V_{FMAX}$ between the current rotational speeds of the front wheels 1 and 2 is smaller than the predetermined reference value $R_F$ as in the step 202. When the ratio $V_{FMIN}/V_{FMAX}$ is smaller than the predetermined reference value $R_F$, the program advances to a step 212. When the ratio $V_{FMIN}/V_{FMAX}$ is equal to or greater than the predetermined reference value $R_F$, the program jumps to the step 220.

The step 212 calculates the elapsed time during which the ratio $V_{FMIN}/V_{FMAX}$ has been continuously smaller than the predetermined reference value $R_F$. The step 212 compares the calculated elapsed time with a predetermined reference time $T_1$ to detect whether or not the ratio $V_{FMIN}/V_{FMAX}$ has been continuously smaller than the predetermined reference value $R_F$ for the predetermined reference time $T_1$ or longer. When the ratio $V_{FMIN}/V_{FMAX}$ has been continuously smaller than the predetermined reference value $R_F$ for the predetermined reference time $T_1$ or longer, the program advances to a step 213. Otherwise, the program jumps to the step 220.

The step 213 sets the flag $f_{FO}$ to "1". The flag $f_{FO}$ being equal to "1" represents the presence of an appreciable difference between the current front-wheel rotational speeds. After the step 213, the program advances to a step 214.

The step 214 compares the current front-wheel rotational speeds $V_{WFR}$ and $V_{WFL}$. When the rotational speed $V_{WFR}$ of the front right wheel 1 is lower than the rotational speed $V_{WFL}$ of the front left wheel 2, the program advances to a step 215. When the rotational speed $V_{WFR}$ of the front right wheel 1 is not lower than the rotational speed $V_{WFL}$ of the front left wheel 2, the program advances to a step 216.

The step 215 sets the flag $f_{FLO}$ to "1". The flag $f_{FLO}$ being equal to "1" represents that a smaller tire is used in the front left wheel 2. After the step 215, the program advances to the step 220.

The step 216 sets the flag $f_{FRO}$ to "1". The flag $f_{FRO}$ being equal to "1" represents that a smaller tire is used in the front right wheel 1. After the step 216, the program advances to the step 220.

The step 220 checks whether or not the flag $f_{ACT}$ is equal to "0", that is, whether or not the slip control is currently performed. When the flag $f_{ACT}$ is equal to "0", that is, when the slip control is not currently performed, the program advances to a step 221. When the flag $f_{ACT}$ is not equal to "0", that is, when the slip control is currently performed, the program exits from the block 104 and proceeds to the block 105 (see FIG. 3).

The step 221 checks whether or not a flag $f_{RO}$ is equal to "1". As will be made clear later, the flag $f_{RO}$ being equal to "1" represents that an appreciable difference is present between the rotational speeds of the rear wheels 3 and 4. When the flag $f_{RO}$ is equal to "1", that is, when an appreciable difference is present between the rotational speeds of the rear wheels 3 and 4, the program advances to a step 222. Otherwise, the program advances to a step 231.

The step 222 judges whether or not the ratio $V_{RMIN}/V_{RMAX}$ between the current rotational speeds of the rear wheels 3 and 4 is smaller than a predetermined reference value $R_R$. The character $V_{RMIN}$ represents the smaller of the current rear-wheel rotational speeds $V_{WRR}$ and $V_{WRL}$. The character $V_{RMAX}$ represents the higher of the current rear-wheel rotational speeds $V_{WRR}$ and $V_{WRL}$. When the ratio $V_{RMIN}/V_{RMAX}$ is smaller than the predetermined reference value $R_R$, the program exits from the block 104 and proceeds to the block 105 (see FIG. 3). When the ratio $V_{RMIN}/V_{RMAX}$ is equal to or greater than the predetermined reference value $R_R$, the program advances to a step 223.

The step 223 calculates the elapsed time during which the ratio $V_{RMIN}/V_{RMAX}$ has been continuously equal to or greater than the predetermined reference value $R_R$. The step 223 compares the calculated elapsed time with the predetermined reference time $T_1'$ to detect whether or not the ratio $V_{RMIN}/V_{RMAX}$ has been continuously equal to or greater than the predetermined reference value $R_R$ for the predetermined reference time $T_1'$ or longer. When the ratio $V_{RMIN}/V_{RMAX}$ has been continuously equal to or greater than the predetermined reference value $R_R$ for the predetermined reference time $T_1'$ or longer, the program advances to a step 224. Otherwise, the program exits from the block 104 and proceeds to the block 105 (see FIG. 3).

The step 224 sets the flag $f_{RO}$ to "0". The flag $f_{RO}$ being equal to "0" represents the absence of an appreciable difference between the current rear-wheel rotational speeds. After the step 224, the program advances to a step 225.

The step 225 resets flags $f_{RRO}$ and $f_{RLO}$ to "0". The flag $f_{RRO}$ being equal to "0" represents that a smaller tire is not used in the rear right wheel 3. The flag $f_{RLO}$ being equal to "0" represents that a smaller tire is not used in the rear left wheel 4. After the step 225, the program exits from the block 104 and proceeds to the block 105 (see FIG. 3).

The step 231 judges whether or not the ratio $V_{RMIN}/V_{RMAX}$ between the current rotational speeds of the rear wheels 3 and 4 is smaller than the predetermined reference value $R_R$ as in the step 222. When the ratio $V_{RMIN}/V_{RMAX}$ is smaller than the predetermined reference value $R_R$, the program advances to a step 232. When the ratio $V_{RMIN}/V_{RMAX}$ is equal to or greater than the predetermined reference value $R_R$, the program exits from the block 104 and proceeds to the block 105 (see FIG. 3).

The step 232 calcuates the elapsed time during which the ratio $V_{RMIN}/V_{RMAX}$ has been continuously smaller than the predetermined reference value $R_R$. The step 232 compares the calculated elapsed time with the predetermined reference time $T_1$ to detect whether or not the ratio $V_{RMIN}/V_{RMAX}$ has been continuously smaller than the predetermined reference value $R_R$ for the predetermined reference time $T_1$ or longer. When the ratio $V_{RMIN}/V_{RMAX}$ has been continuously smaller than the predetermined reference value $R_R$ for the predetermined reference time $T_1$ or longer, the program advances to a step 233. Otherwise, the program exits from the block 104 and proceeds to the block 105 (see FIG. 3).

The step 233 sets the flag $f_{RO}$ to "1". The flag $f_{RO}$ being equal to "1" represents the presence of an appreciable difference between the current rear-wheel rotational speeds. After the step 233, the program advances to a step 234.

The step 234 compares the current rear-wheel rotational speeds $V_{WRR}$ and $V_{WRL}$. When the rotational speed $V_{WRR}$ of the rear right wheel 3 is lower than the rotational speed $V_{WRL}$ of the rear left wheel 4, the program advances to a step 235. When the rotational speed $V_{WRR}$ of the rear right wheel 3 is not lower than the rotational speed $V_{WRL}$ of the rear left wheel 4, the program advances to a step 236.

The step 235 sets the flag $f_{RLO}$ to "1". The flag $f_{RLO}$ being equal to "1" represents that a smaller tire is used in the rear left wheel 4. After the step 235, the program exits from the block 104 and proceeds to the block 105 (see FIG. 3).

The step 236 sets the flag $f_{RRO}$ to "1". The flag $f_{RRO}$ being equal to "1" represents that a smaller tire is used in the rear right wheel 3. After the step 236, the program exits from the block 104 and proceeds to the block 105 (see FIG. 3).

With reference to FIGS. 1 and 2, the sensors 5, 6, 7, and 8 output pulses at periods inversely proportional to the rotational speeds of the vehicle wheels 1, 2, 3, and 4 respectively. The microcomputer 36 is programmed to count the output pulses from the sensors 5, 6, 7, and 8. The count numbers of the output pulses from the sensors 5, 6, 7, and 8 are inversely proportional to the rotational speeds of the vehicle wheels 1, 2, 3, and 4 respectively.

The block 105 of FIG. 3 uses variables $P_{FR}$, $P_{FL}$, $P_{RR}$, and $P_{RL}$ representing the count numbers of the output pulses from the sensors 5, 6, 7, and 8 respectively. The pulse count number $P_{FR}$ is incremented each time the related sensor 5 outputs a pulse. Similarly, the pulse count numbers $P_{FL}$, $P_{RR}$, and $P_{RL}$ are incremented in response to pulses outputted from the sensors 6, 7, and 8 respectively.

Figure 5:
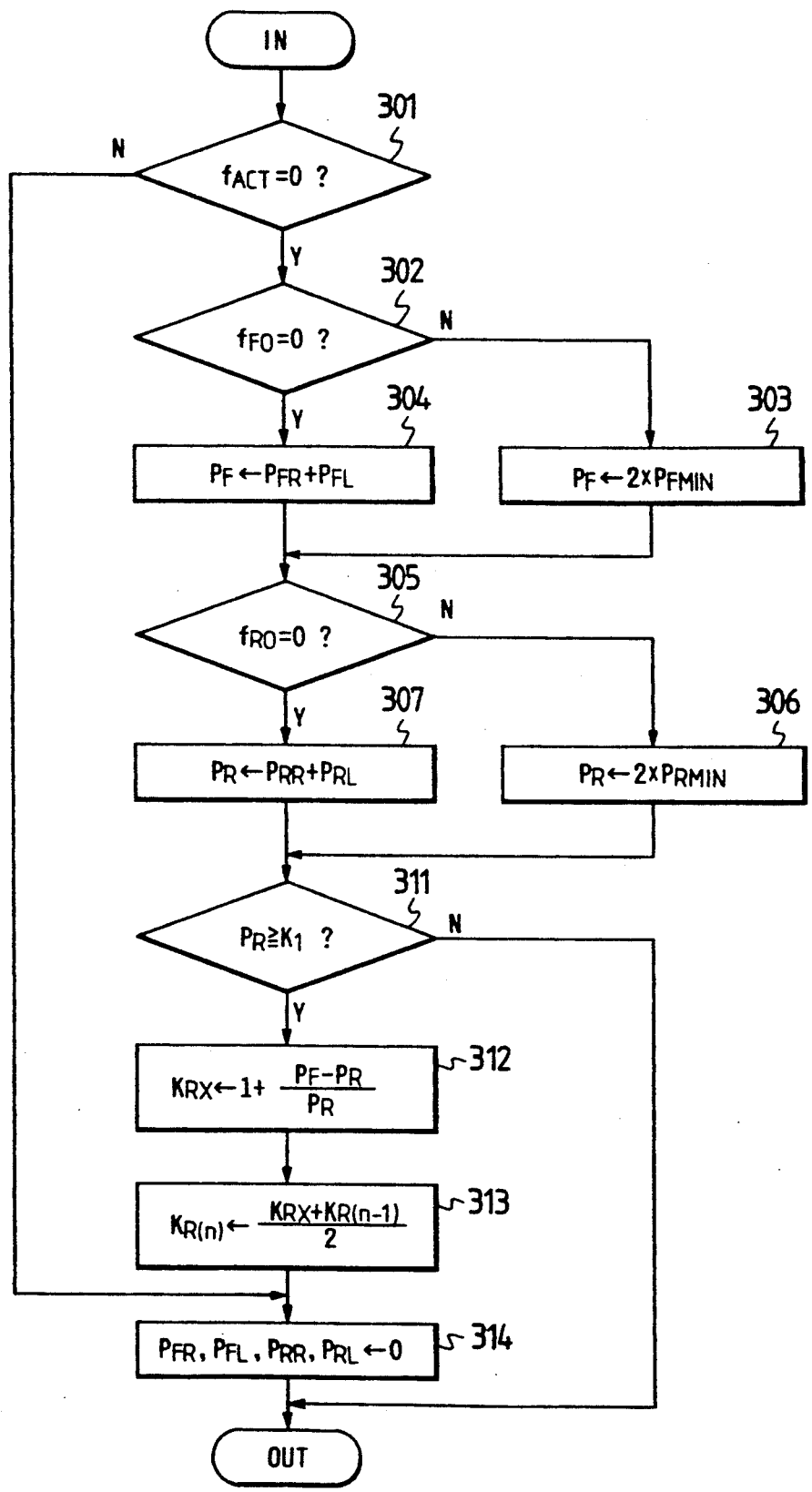
FIG. 5 is a flowchart showing the internal design of the corrective coefficient calculating block of FIG. 3.

FIG. 5 shows an internal design of the corrective coefficient calculating block 105. A first step 301 of the block 105 checks whether or not the flag $f_{ACT}$ is equal to "0", that is, whether or not the slip control is currently performed. When the flag $f_{ACT}$ is equal to "0", that is, when the slip control is not currently performed, the program advances to a step 302. When the flag $f_{ACT}$ is not equal to "0", that is, when the slip control is currently performed, the program jumps to a step 314.

The step 302 checks whether or not the flag $f_{FO}$ is equal to "0", that is, whether or not an appreciable difference between the front-wheel rotational speeds is present or absent. When the flag $f_{FO}$ is not equal to "0", that is, when an appreciable difference between the front-wheel rotational speeds is present, the program advances to a step 303. When the flag $f_{FO}$ is equal to "0", that is, when an appreciable difference between the front-wheel rotational speeds is absent, the program advances to a step 304.

The step 303 compares the front-wheel pulse count numbers $P_{FR}$ and $P_{FL}$ to determine the smaller of the front-wheel pulse count numbers $P_{FR}$ and $P_{FL}$. The smaller of the front-wheel pulse count numbers $P_{FR}$ and $P_{FL}$ is represented by the variable $P_{FMIN}$. The step 303 calculates a value $P_F$ which equals the smaller count number $P_{FMIN}$ multiplied by 2. The step 303 ignores the greater of the front-wheel pulse count numbers $P_{FR}$ and $P_{FL}$ which corresponds to the front wheel using a smaller tire. After the step 303, the program advances to a step 305.

The step 304 calculates a value $P_F$ which equals the sum of the front-wheel pulse count numbers $P_{FR}$ and $P_{FL}$. After the step 304, the program advances to the step 305.

The step 305 checks whether or not the flag $f_{RO}$ is equal to "0", that is, whether or not an appreciable difference between the rear-wheel rotational speeds is present or absent. When the flag $f_{RO}$ is not equal to "0", that is, when an appreciable difference between the rear-wheel rotational speeds is present, the program advances to a step 306. When the flag $f_{RO}$ is equal to "0", that is, when an appreciable difference between the rear-wheel rotational speeds is absent, the program advances to a step 307.

The step 306 compares the rear-wheel pulse count numbers $P_{RR}$ and $P_{RL}$ to determine the smaller of the rear-wheel pulse count numbers $P_{RR}$ and $P_{RL}$. The smaller of the rear-wheel pulse count numbers $P_{RR}$ and $P_{RL}$ is represented by the variable $P_{RMIN}$. The step 306 calculates a value $P_R$ which equals the smaller count number $P_{RMIN}$ multiplied by 2. The step 306 ignores the greater of the rear-wheel pulse count numbers $P_{RR}$ and $P_{RL}$ which corresponds to the rear wheel using a smaller tire. After the step 306, the program advances to a step 311.

The step 307 calculates a value $P_R$ which equals the sum of the rear-wheel pulse count numbers $P_{RR}$ and $P_{RL}$. After the step 307, the program advances to the step 311.

The step 311 compares the value $P_R$ with a predetermined reference value $K_1$. When the value $P_R$ is smaller than the predetermined reference value $K_1$, for example, when the distance traveled by the vehicle since the moment of the last start of the engine is short, the program exits from the block 105 and proceeds to the block 106 (see FIG. 3). When the value $P_R$ is equal to or greater than the predetermined reference value $K_1$, for example, when the distance traveled by the vehicle since the moment of the last start of the engine is adequately long, the program advances to a step 312.

The step 312 calculates a first corrective value $K_{RX}$ by referring to the equation "$K_{RX}=1+\{(P_F-P_R)/P_R\}$". After the step 312, the program advances to a step 313.

The step 313 calculates a final corrective value $K_{R(n)}$ from the first corrective value and the previously-calculated final corrective value through an averaging process. Specifically, the final corrective value $K_{R(n)}$ is calculated by referring to the equation "$K_{R(n)}=\{K_{RX}+K_{R(n-1)}\}/2$" where character $K_{R(n-1)}$ represents the final corrective value calculated during the immediately preceding execution cycle of the program. The suffix "$(n)$" in the character $K_{R(n)}$ denotes that the related final corrective value is obtained during the current execution cycle of the program. After the step 313, the program advances to the step 314.

The step 314 resets the pulse count number $P_{FR}$, $P_{FL}$, $P_{RR}$, and $P_{RL}$ to "0". After the step 314, the program exits from the block 105 and proceeds to the block 106 (see FIG. 3).

Figure 6A:
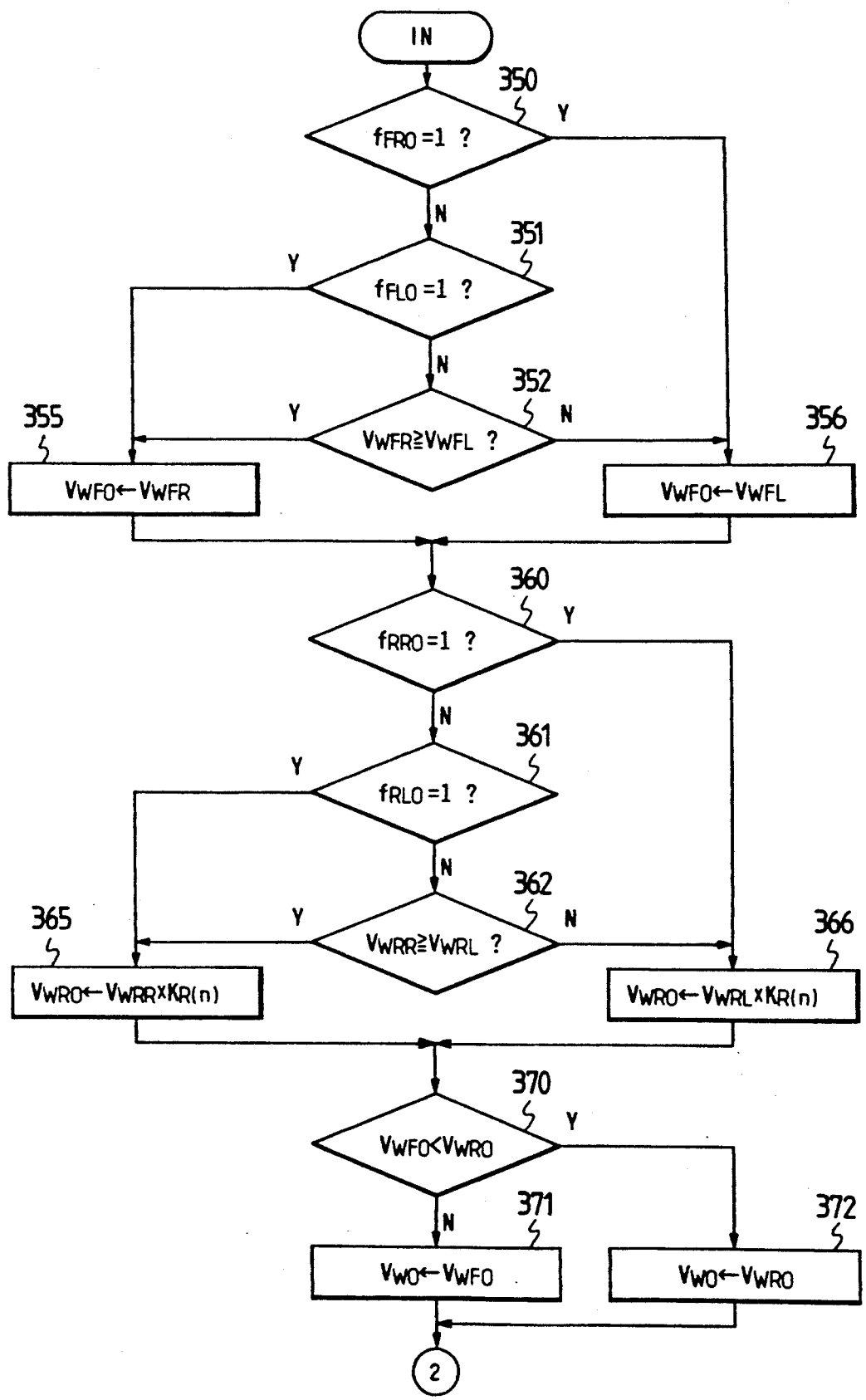
FIGS. 6(a) and 6(b) are a flowchart showing the slip reference calculating block of FIG. 3.
Figure 6B:
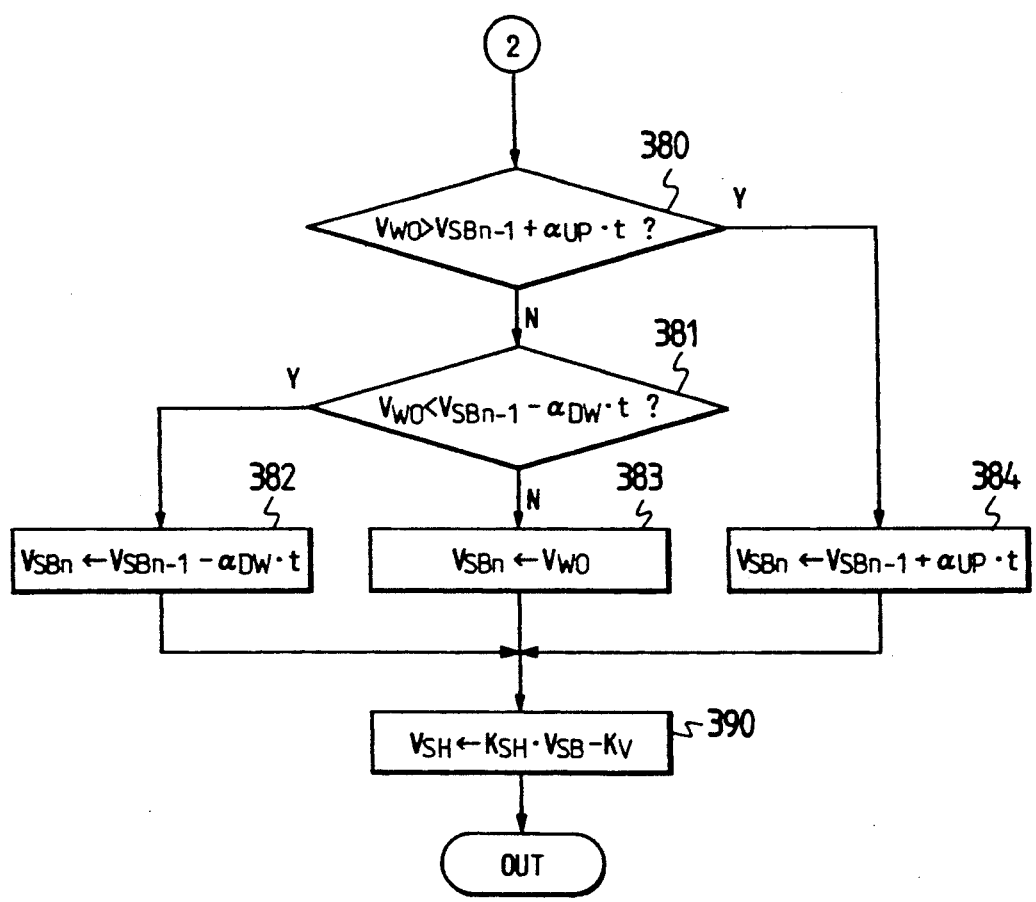

FIGS. 6(a) and 6(b) show an internal design of the slip reference calculating block 106. A first step 350 of the block 106 checks whether or not the flag $f_{FRO}$ is equal to "1", that is, whether or not a smaller tire is used in the front right wheel 1. When the flag $f_{FRO}$ is not equal to "1", that is, when a smaller tire is not used in the front right wheel 1, the program advances to a step 351. When the flag $f_{FRO}$ is equal to "1", that is, when a smaller tire is used in the front right wheel 1, the program advances to a step 356.

The step 351 checks whether or not the flag $f_{FLO}$ is equal to "1", that is, whether or not a smaller tire is used in the front left wheel 2. When the flag $f_{FLO}$ is not equal to "1", that is, when a smaller tire is not used in the front left wheel 2, the program advances to a step 352. When the flag $f_{FLO}$ is equal to "1", that is, when a smaller tire is used in the front left wheel 2, the program advances to a step 355.

The step 352 compares the front-wheel rotational speeds $V_{WFR}$ and $V_{WFL}$. When the rotational speed $V_{WFR}$ of the front right wheel 1 is equal to or higher than the rotational speed $V_{WFL}$ of the front left wheel 2, the program advances to the step 355. Otherwise, the program advances to the step 356.

The step 355 sets the front-wheel selected speed $V_{WFO}$ equal to the rotational speed $V_{WFR}$ of the front right wheel 1. After the step 355, the program advances to a step 360.

The step 356 sets the front-wheel selected speed $V_{WFO}$ equal to the rotational speed $V_{WFL}$ of the front left wheel 2. After the step 356, the program advances to the step 360.

The step 360 checks whether or not the flag $f_{RRO}$ is equal to "1", that is, whether or not a smaller tire is used in the rear right wheel 3. When the flag $f_{RRO}$ is not equal to "1", that is, when a smaller tire is not used in the rear right wheel 3, the program advances to a step 366. When the flag $f_{RRO}$ is equal to "1", that is, when a smaller tire is used in the rear right wheel 3, the program advances to a step 366.

The step 361 checks whether or not the flag $f_{RLO}$ is equal to "1", that is, whether or not a smaller tire is used in the rear left wheel 4. When the flag $f_{RLO}$ is not equal to "1", that is, when a smaller tire is not used in the rear left wheel 4, the program advances to a step 362. When the flag $f_{RLO}$ is equal to "1", that is, when a smaller tire is used in the rear left wheel 4, the program advances to a step 365.

The step 362 compares the rear-wheel rotational speeds $V_{WRR}$ and $V_{WRL}$. When the rotational speed $V_{WRR}$ of the rear right wheel 3 is equal to or higher than the rotational speed $V_{WRL}$ of the rear left wheel 4, the program advances to the step 365. Otherwise, the program advances to the step 366.

The step 365 sets the rear-wheel selected speed $V_{WRO}$ equal to the rotational speed $V_{WRR}$ of the rear right wheel 3 which is multiplied by the corrective coefficient $K_{R(n)}$. After the step 365, the program advances to a step 370.

The step 366 sets the rear-wheel selected speed $V_{WRO}$ equal to the rotational speed $V_{WRL}$ of the rear left wheel 4 which is multiplied by the corrective coefficient $K_{R(n)}$. After the step 366, the program advances to the step 370.

The step 370 compares the front-wheel and rear-wheel selected speeds $V_{WFO}$ and $V_{WRO}$. When the front-wheel selected speed $V_{WFO}$ is not lower than the rear-wheel selected speed $V_{WRO}$, the program advances to a step 371. Otherwise, the program advances to a step 372.

The step 371 sets the finally selected speed $V_{WO}$ equal to the front-wheel selected speed $V_{WFO}$. After the step 371, the program advances to a step 380.

The step 372 sets the finally selected speed $V_{WO}$ equal to the rear-wheel selected speed $V_{WRO}$. After the step 372, the program advances to the step 380.

The step 380 compares the finally selected speed $V_{WO}$ with the value "$V_{SB(n-1)}+\alpha_{UP}\cdot t$". When the finally selected speed $V_{WO}$ is greater than the value "$V_{SB(n-1)}+\alpha_{UP}\cdot t$", the program advances to a step 384. Otherwise, the program advances to a step 381.

The step 381 compares the finally selected speed $V_{WO}$ with the value "$V_{SB(n-1)}-\alpha_{DW}\cdot t$". When the finally selected speed $V_{WO}$ is smaller than the value "$V_{SB(n-1)}-\alpha_{DW}\cdot t$", the program advances to a step 382. Otherwise, the program advances to a step 383.

The step 382 sets the current estimated vehicle speed $V_{SB(n)}$ equal to the value "$V_{SB(n-1)}-\alpha_{DW}\cdot t$". After the step 382, the program advances to a step 390.

The step 383 sets the current estimated vehicle speed $V_{SB(n)}$ equal to the finally selected speed $V_{WO}$. After the step 383, the program advances to the step 390.

The step 384 sets the current estimated vehicle speed $V_{SB(n)}$ equal to the value "$V_{SB(n-1)}+\alpha_{UP}\cdot t$". After the step 384, the program advances to the step 390.

The step 390 calculates the slip judgment reference speed $V_{SH}$ on the basis of the estimated vehicle speed $V_{SB}$ set by one of the steps 382, 383, and 384. Specifically, the slip judgment reference speed $V_{SH}$ is calculated by referring to the following equation.

$$V_{SH}=K_{SH}\cdot V_{SB}-K_V$$

where the character $K_{SH}$ denotes a predetermined coefficient, and the character $K_V$ denotes a predetermined value. For example, the coefficient $K_{SH}$ is set to 0.95, and the value $K_V$ is set to 5 km/h. It is preferable that the coefficient $K_{SH}$ and the value $K_V$ are chosen so as to compensate the response lags of the actuators 21-24 and the calculation lags in the ECU 30. After the step 390, the program exits from the block 106 and proceeds to the block 107 (see FIG. 3).

Figure 7:
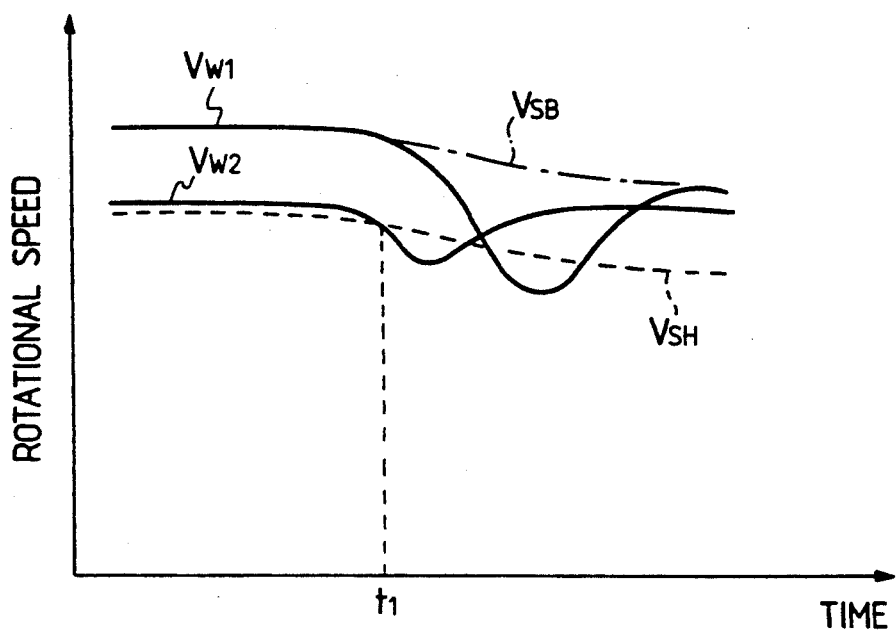
FIG. 7 is a timing diagram showing time-dependent variations of various speeds in an assumed design.

In the case where one of the vehicle wheels has a smaller tire and others have standard tires, as shown in FIG. 7, the calculated rotational speed $V_{W1}$ of the vehicle wheel having the smaller tire is higher than the calculated rotational speeds $V_{W2}$ of the other vehicle wheels by a value corresponding to the difference between the effective outside diameters of the smaller tire and the standard tire.

In an assumed design where the calculated rotational speed $V_{W1}$ of the vehicle wheel having the smaller tire is used as the finally selected speed $V_{W0}$, the slip judgment reference speed $V_{SH}$ is set higher than a suitable value. Thus, in this assumed design, as shown in FIG. 7, the slip control of the vehicle wheels having the standard tires is started at an excessively early moment t1.

Figure 8:
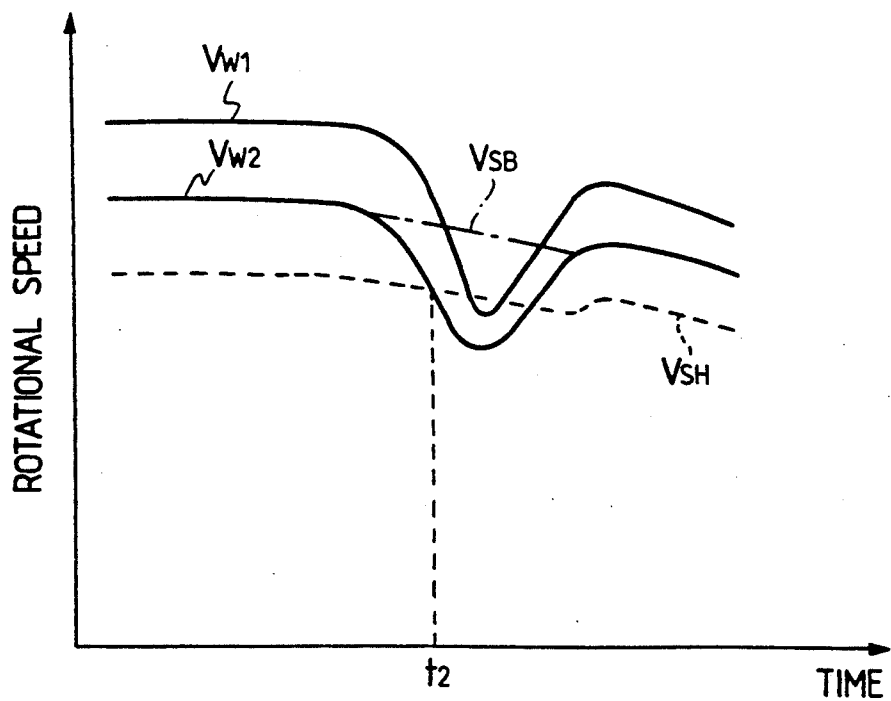
FIG. 8 is a timing diagram corresponding to FIG. 7 and showing time-dependent variations of various speeds in the vehicle control system of FIG. 1.

In the embodiment of this invention, the vehicle wheel having the smaller tire is detected or identified. In addition, the calculated rotational speed $V_{W1}$ of the vehicle wheel having the smaller tire is excluded from the process of determining the finally selected speed $V_{W0}$. Thus, in the embodiment of this invention, the estimated vehicle speed $V_{SH}$ is determined on the basis of only the calculated rotational speeds $V_{W2}$ of the vehicle wheels having the standard tires, so that the slip control of the vehicle wheels having the standard tires is started at a suitable moment t2 as shown in FIG. 8.

Figure 9:
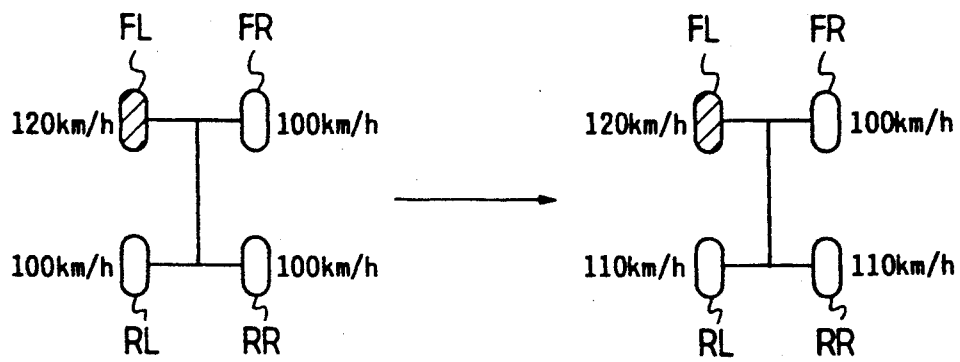
FIG. 9 is a diagram showing vehicle wheels and speeds of the vehicle wheels in an assumed design.

A design is now assumed which uses all the rotational speeds of the vehicle wheels 1-4 in determining the corrective coefficient $K_{R(n)}$. This assumed design has the following problem. In the case where the front left wheel FL has a smaller tire and the other vehicle wheels FR, RL, and RR have standard tires, the speed of the front left wheel FL is equal to 120 km/h and the speeds of the other vehicle wheels FR, RL, and RR are equal to 100 km/h under certain conditions as shown in the left-hand half of FIG. 9. At this time, the calculated corrective coefficient $K_{R(n)}$ is equal to 1.1 provided that the front-wheel speeds are used as a reference in calculating the corrective coefficient $K_{R(n)}$. This corrective coefficient $K_{R(n)}$ forces the rear-wheel speeds to be corrected to 110 km/h as shown in the right-hand half of FIG. 9. After the correction, the speed of the front right wheel FR is lower than the speeds of the other vehicle wheels FL, RL, and RR. Thus, the slip control of the front right wheel FR is started at an excessively early time.

Figure 10:
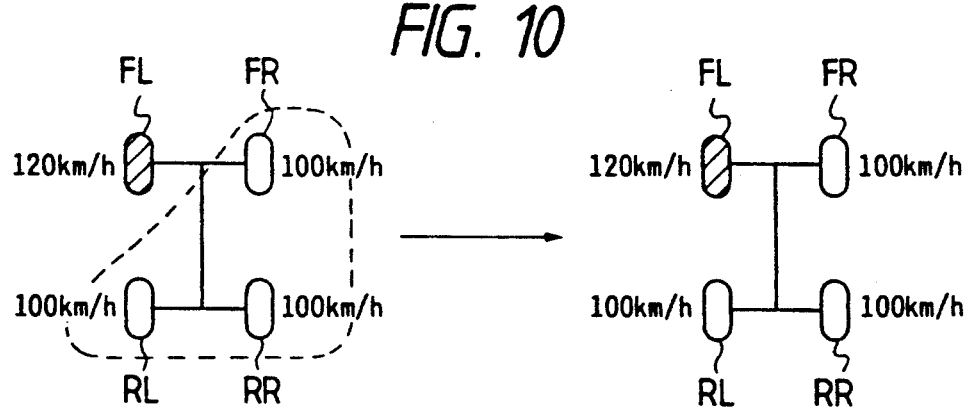
FIG. 10 is a diagram corresponding to FIG. 9 and showing the vehicle wheels and the speeds of the vehicle wheels in the vehicle control system of FIG. 1.

In the embodiment of this invention, the speed of the vehicle wheel having the smaller tire is excluded from the process of determining the corrective coefficient $K_{R(n)}$ so that the speed of the front right wheel is kept equal to the speeds of the rear wheels RL and RR after the speed correction as shown in FIG. 10. Thus, in the embodiment of this invention, it is possible to prevent the slip control of the front right wheel FR from being started at an excessively early time.

Figure 11:
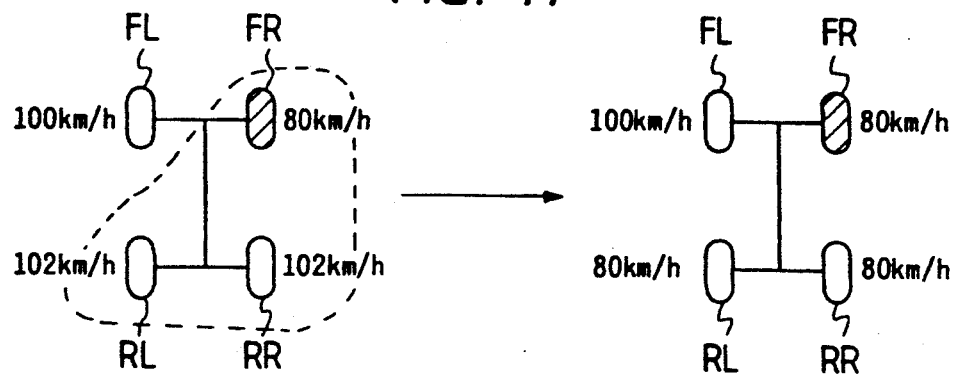
FIG. 11 is a diagram similar to FIG. 10 which shows the vehicle wheels and the speeds of the vehicle wheels in the vehicle control system of FIG. 1.

As will be explained hereinafter, the embodiment of this invention produces an advantage also in the case where one of the vehicle wheels has a tire larger in diameter than a standard tire and the other vehicle wheels have standard tires. For example, in the case where the front right wheel FR has a larger tire and the other vehicle wheels FL, RL, and RR have standard tires, the speed of the front right wheel FR is equal to 80 km/h and the speeds of the other vehicle wheels FL, RL, and RR are equal to 102 km/h under certain conditions as shown in the left-hand half of FIG. 11. At this time, the front left wheel FL is judged to be equipped with a smaller tire, and the speed of the front left wheel FL is excluded from the process of determining the corrective coefficient $K_{R(n)}$. The determined corrective coefficient $K_{R(n)}$ forces the rear-wheel speeds to be corrected to 80 km/h as shown in the right-hand half of FIG. 11. Since the speed of the front left wheel FL is excluded also from the process of determining the finally selected speed $V_{W0}$, the estimated vehicle speed $V_{SB}$ is determined on the basis of the speeds of the other vehicle wheels FR, RL, and RR. Thus, the estimated vehicle speed $V_{SB}$ is lower than an actual vehicle speed so that the slip control is prevented from being started at an excessively early moment.

As described previously, in the embodiment of this invention, the speed of the vehicle wheel having a smaller tire is excluded from the processes of determining the corrective coefficient $K_{R(n)}$ and the estimated vehicle speed $V_{SB}$ so that reliable slip control can be performed even when the tires of the vehicle wheels have different sizes.

It should be noted that this invention can be applied to an antiskid control system of the three-channel type which has three actuators. In addition, this invention can be applied to other systems such as a traction control system or a four-wheel steering system which uses vehicle wheel speed sensors.

What is claimed is:

1. A vehicle control system comprising:
   a rotational speed sensing means for sensing rotational speeds of respective vehicle wheels including a right-hand vehicle wheel and a left-hand vehicle wheel;
   a speed calculating means for calculating a speed of the right-hand vehicle wheel and a speed of the left-hand vehicle wheel on the basis of said sensed rotational speeds;
   a ratio calculating means for calculating a ratio between the calculated speeds of the right-hand vehicle wheel and the left-hand vehicle wheel;
   a judging means for judging if a smaller vehicle wheel is being used on the basis of said calculated ratio;
   a control quantity calculating means for, in cases where the judging means judges that a vehicle wheel having a small tire is not used, calculating a control quantity by use of all the sensed rotational speeds, and for, in cases where the judging means judges that a vehicle wheel having a small tire is used, calculating a control quantity by use of the sensed rotational speeds except for the sensed rotational speed of the vehicle wheel having the small tire; and
   a controlling means for controlling a controlled object in accordance with the calculated control quantity.

2. The vehicle control system of claim 1 wherein the control quantity comprises an estimated vehicle speed, in cases where the judging means judges that none of the vehicle wheels use a small tire, the control-quantity-calculating means is operative to calculate the estimated vehicle speed on the basis of one of the sensed rotational speeds which represents a highest speed; and wherein in cases where the judging means judges that a vehicle wheel uses a small tire, the control-quantity-calculating means is operative to calculate the estimated vehicle speed on the basis of one of the sensed rotational speeds which represents a highest speed excluding the sensed rotational speed of the vehicle wheel uses the small tire.

3. The vehicle control system of claim 1 wherein the control quantity comprises a corrective coefficient for correcting a difference between a speed of a front vehicle wheel and a speed of a rear vehicle wheel, in cases where the judging means judges that none of the vehicle wheels use a small tire, the control-quantity-calculating means is operative to calculate the corrective coefficient on the basis of all the sensed rotational speeds, where one of the front vehicle wheel and the rear vehicle wheel is selected as a reference and the corrective coefficient corrects a deviation of the speed of the other front vehicle wheel and the other rear vehicle wheel with respect to said reference vehicle wheel, and in cases where the judging means judges that one of said vehicle wheels uses a small tire, the control-quantity-calculating means is operative to calculate the corrective coefficient by use of the sensed rotational speeds except for the sensed rotational speed of said one of said vehicle wheels using the small tire.

4. A vehicle control system comprising:
- a rotational speed sensing means for sensing rotational speeds of at least three vehicle wheels including a right-hand vehicle wheel and a left-hand vehicle wheel;
- a speed calculating means for calculating speeds of the vehicle wheels one the basis of the rotational speeds from the rotational speed sensing means;
- a judging means for judging whether a tire used in the right-hand vehicle wheel and a tire used in the left-hand vehicle wheel are different in size on the basis of the calculated speeds of the vehicle wheels;
- a selecting means for, in cases where the judging means judges that said tires having different sizes are being used, selecting one of said right-hand vehicle wheel and left-hand vehicle wheel which uses a smaller tire;
- a corrective coefficient calculating means for calculating a corrective coefficient on the bais of the calculating speeds of the vehicle wheel except for the calculated speed of the selected vehicle wheel which uses said smaller tire, wherein one of a front vehicle wheel and rear vehicle wheel is defined as a reference and the corrective coefficient corrects a deviation of the speed of the other front vehicle wheel and the other rear vehicle wheel with respect to said reference vehicle wheel;
- speed correcting means for correcting the speed of the other of the front vehicle wheel and the rear vehicle wheel by use of the corrective coefficient calculated by the corrective-coefficient-calculating means to remove a difference between the speeds of the front vehicle wheel and the rear vehicle wheel;
- an excluding means for excluding the speed of the vehicle wheel selected by the selecting means, and for calculating an estimated speed of a vehicle on the basis of the speed of said reference vehicle wheel and speeds of said corrected vehicle wheels.

5. The vehicle control system of claim 4 wherein the judging means comprises:
- a comparing means for comparing a difference between the speeds of the right-hand vehicle wheel and the left-hand vehicle wheel with a predetermined value;
- a measuring means for, in cases where a result of the comparing by the comparing means represents that the difference between the speeds of the right-hand vehicle wheel and the left-hand vehicle wheel is greater than the predetermined value, measuring a duration of time that a condition exists where the difference between the speeds of the right-hand vehicle wheel and the left-hand vehicle wheel is greater than the predetermined value; and
- a detecting means for detecting a presence of said tires having different sizes of the basis of a fact that the duration of said time measured by the measuring means reaches a predetermined time.

6. The vehicle control system of claim 4 wherein the controlling means comprises an adjusting means for adjusting brake pressures to the vehicle wheels, and controlling the adjusting means to adjust the brake pressures to the vehicle wheels to perform antiskid control.

7. A control system for a vehicle, which has a plurality of vehicle wheels and antiskid control, comprising:
- a rotational speed sensing means for sensing rotational speeds of the vehicle wheels and generating sensor signals representing the sensed speeds of the vehicle wheels respectively;
- a calculating means for calculating rotational speeds of the vehicle wheels based on the sensor signals;
- a controlling means for controlling the antiskid control of the vehicle in accordance with the calculated rotational speeds;
- a detecting means for detecting whether the effective outside diameters of the vehicle wheels are appreciably different based on a ratio of two of said calculated rotational speeds;
- an identifying means for identifying the sensor signal which represents the sensed speed of the vehicle wheel having a smaller effective outside diameter when the detecting means detects that the effective outside diameters of the vehicle wheels are appreciably different;
- an inhibiting means for inhibiting the identifying means during execution of said antiskid control; and
- an excluding means for excluding the sensor signal identified by the identifying means from the controlling of the vehicle with said antiskid control by the controlling means when the detecting means detects that the effective outside diameters for the vehicle wheels are appreciably different.

* * * * *